United States Patent
Ebrahimi et al.

(10) Patent No.: US 12,480,876 B2
(45) Date of Patent: Nov. 25, 2025

(54) QUANTUM SENSOR

(71) Applicant: Endress+Hauser SE+Co. KG, Maulburg (DE)

(72) Inventors: Mohammad Sadegh Ebrahimi, Lörrach (DE); Gerd Bechtel, Steinen (DE); Raphael Kuhnen, Schliengen (DE); Tobias Brengartner, Emmendingen (DE); Dietmar Frühauf, Lörrach (DE); Anh Tuan Tham, Berlin (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 233 days.

(21) Appl. No.: 18/245,492

(22) PCT Filed: Aug. 30, 2021

(86) PCT No.: PCT/EP2021/073825
§ 371 (c)(1),
(2) Date: Mar. 15, 2023

(87) PCT Pub. No.: WO2022/058141
PCT Pub. Date: Mar. 24, 2022

(65) Prior Publication Data
US 2023/0341327 A1    Oct. 26, 2023

(30) Foreign Application Priority Data
Sep. 15, 2020    (DE) ............. 10 2020 123 993.9

(51) Int. Cl.
*G01N 21/64* (2006.01)
*G01N 21/95* (2006.01)
*G01N 33/00* (2006.01)

(52) U.S. Cl.
CPC ........... *G01N 21/645* (2013.01); *G01N 21/95* (2013.01); *G01N 33/39* (2024.05); *G01N 2201/08* (2013.01)

(58) Field of Classification Search
None
See application file for complete search history.

(56) References Cited

U.S. PATENT DOCUMENTS 5,321,258 A     6/1994  Kinney
7,004,620 B2 *  2/2006  Simunovic ............. G01K 13/02
                                                374/176

(Continued)

FOREIGN PATENT DOCUMENTS

CN    102026719 A1    4/2011
CN    105705913 A1    6/2016

(Continued)

OTHER PUBLICATIONS

English Translation of DE102017205099A1 (Year: 2017).*

*Primary Examiner* — David P Porta
*Assistant Examiner* — Djura Malevic
(74) *Attorney, Agent, or Firm* — Brannon Sowers & Cracraft PC

(57) ABSTRACT

A sensor apparatus for determining and/or monitoring a process variable of a medium in a containment includes: a crystal body including at least one defect; a magnetic field system for producing a magnetic field in the region of the crystal body and in the region of the medium within the containment, wherein the crystal body and the magnetic field system are arrangeable from the outside at a wall of the containment; a detection unit for detecting a magnetic field-dependent, fluorescent signal from the crystal body, wherein the detection unit has an excitation unit for optical exciting of the defect and a detector for detecting the fluorescent signal; and an evaluation unit for ascertaining at (Continued)

least one piece of information concerning the process variable based on the fluorescent signal.

19 Claims, 3 Drawing Sheets

(56) References Cited

U.S. PATENT DOCUMENTS

| | | | | |
|---|---|---|---|---|
| 8,143,896 | B2* | 3/2012 | McDowell | G01R 33/302 324/318 |
| 9,329,152 | B2* | 5/2016 | Walker | G01N 27/74 |
| 9,632,045 | B2* | 4/2017 | Englund | G01N 21/6402 |
| 9,759,719 | B1* | 9/2017 | Acosta | G01N 33/588 |
| 9,766,181 | B2* | 9/2017 | Englund | G01N 21/6489 |
| 9,897,603 | B1* | 2/2018 | Acosta | G01N 33/588 |
| 9,910,105 | B2* | 3/2018 | Boesch | G01R 33/032 |
| 10,088,336 | B2* | 10/2018 | Fisk | G01V 1/186 |
| 10,184,796 | B2* | 1/2019 | Overstreet | G01R 33/26 |
| 10,648,934 | B2* | 5/2020 | Kim | G02B 7/04 |
| 10,677,953 | B2* | 6/2020 | Stetson | G01V 3/101 |
| 10,712,408 | B2* | 7/2020 | Pham | G01N 24/12 |
| 10,989,724 | B1* | 4/2021 | Holmes | G01N 35/10 |
| 11,112,418 | B1* | 9/2021 | Holmes | G01N 15/1434 |
| 11,346,904 | B2* | 5/2022 | Pham | G01N 24/12 |
| 11,391,793 | B2* | 7/2022 | Meijer | G01R 33/032 |
| 11,519,794 | B2* | 12/2022 | Schalles | G01K 15/005 |
| 11,761,825 | B2* | 9/2023 | Cassella | G01K 7/34 374/152 |
| 11,808,831 | B2* | 11/2023 | Herbschleb | G01R 33/26 |
| 11,885,887 | B1* | 1/2024 | Mazed | G01S 17/89 |
| 11,906,452 | B2* | 2/2024 | Wilhelm | G01N 24/10 |
| 11,976,955 | B2* | 5/2024 | Agarwal | G01F 23/284 |
| 12,031,875 | B2* | 7/2024 | Culbertson | G01K 7/02 |
| 2003/0211011 | A1* | 11/2003 | Phillips | G01N 21/27 436/163 |
| 2004/0213322 | A1* | 10/2004 | Simunovic | G01K 1/022 374/208 |
| 2007/0058260 | A1* | 3/2007 | Steenblik | B42D 25/391 359/626 |
| 2008/0064413 | A1* | 3/2008 | Breed | B60R 21/01542 455/456.1 |
| 2008/0282817 | A1* | 11/2008 | Breed | B60R 21/01516 73/865.9 |
| 2009/0146658 | A1* | 6/2009 | McDowell | G01R 33/302 324/309 |
| 2010/0207631 | A1* | 8/2010 | McDowell | G01R 33/302 324/318 |
| 2010/0308813 | A1* | 12/2010 | Lukin | G01R 33/1284 324/244.1 |
| 2012/0019242 | A1* | 1/2012 | Hollenberg | G01N 24/10 324/300 |
| 2012/0028680 | A1* | 2/2012 | Breed | G01S 15/42 455/556.1 |
| 2012/0112744 | A1* | 5/2012 | McDowell | G01R 33/465 324/309 |
| 2013/0139609 | A1* | 6/2013 | Pinton | G01F 1/584 73/861.11 |
| 2013/0214773 | A1* | 8/2013 | Ueno | G01R 33/032 324/262 |
| 2013/0334170 | A1* | 12/2013 | Englund | H01L 21/31116 156/345.19 |
| 2014/0017670 | A1* | 1/2014 | Yu | G01N 35/08 435/5 |
| 2014/0035584 | A1* | 2/2014 | Twitchen | B01L 3/502715 324/321 |
| 2014/0094372 | A1* | 4/2014 | Englund | H10N 60/0241 505/181 |
| 2014/0166904 | A1* | 6/2014 | Walsworth | G01N 21/645 250/200 |
| 2014/0191139 | A1* | 7/2014 | Englund | G01N 21/6428 536/23.1 |
| 2015/0001422 | A1* | 1/2015 | Englund | G01N 21/6486 250/226 |
| 2015/0022376 | A1* | 1/2015 | Zhang | G01F 23/26 340/870.37 |
| 2015/0192532 | A1* | 7/2015 | Clevenson | G01N 24/006 324/304 |
| 2015/0377865 | A1* | 12/2015 | Acosta | A61B 5/055 435/7.1 |
| 2016/0161429 | A1* | 6/2016 | Englund | G01N 21/6402 324/304 |
| 2017/0056878 | A1* | 3/2017 | Peytavi | B01F 23/45 |
| 2017/0322244 | A1* | 11/2017 | Chipaux | G01R 23/163 |
| 2017/0343695 | A1* | 11/2017 | Stetson | G01V 3/101 |
| 2017/0370979 | A1* | 12/2017 | Braje | G01R 29/0885 |
| 2018/0136291 | A1* | 5/2018 | Pham | G01R 33/24 |
| 2019/0002294 | A1* | 1/2019 | Munday | C01B 32/28 |
| 2019/0132909 | A1 | 5/2019 | Wu et al. | |
| 2019/0217226 | A1* | 7/2019 | Kowatch | B01D 29/333 |
| 2019/0235031 | A1* | 8/2019 | Ibrahim | G01R 33/24 |
| 2019/0360877 | A1* | 11/2019 | Schalles | G01K 7/36 |
| 2020/0057117 | A1* | 2/2020 | Nishibayashi | G01R 33/0017 |
| 2020/0096377 | A1* | 3/2020 | Agarwal | G01F 23/26 |
| 2020/0132785 | A1* | 4/2020 | Yoshii | G01R 33/032 |
| 2021/0011098 | A1* | 1/2021 | Pham | G01N 24/10 |
| 2021/0255254 | A1* | 8/2021 | Lo | G01R 33/02 |
| 2021/0318348 | A1* | 10/2021 | Holmes | G01N 35/04 |
| 2022/0397429 | A1* | 12/2022 | Burchard | G01H 11/02 |
| 2024/0050521 | A1* | 2/2024 | Wilson | C07K 14/47 |
| 2024/0358624 | A1* | 10/2024 | Sato | A61Q 19/007 |
| 2025/0093345 | A1* | 3/2025 | Mazed | G06Q 30/0273 |
| 2025/0230291 | A1* | 7/2025 | Anzelmo | C08K 3/042 |

FOREIGN PATENT DOCUMENTS

| | | |
|---|---|---|
| CN | 108318063 A1 | 7/2018 |
| CN | 108414051 A1 | 8/2018 |
| CN | 111077120 A1 | 4/2020 |
| CN | 111679098 A | 9/2020 |
| DE | 3341265 A1 | 5/1985 |
| DE | 3742878 A1 | 7/1989 |
| DE | 69523559 T2 | 12/2001 |
| DE | 102014219547 A1 | 3/2016 |
| DE | 102014219550 A1 | 3/2016 |
| DE | 102016210259 A1 | 12/2017 |
| DE | 102016221065 A1 | 4/2018 |
| DE | 102017205099 A1 | 9/2018 |
| DE | 102017205265 A1 | 10/2018 |
| DE | 102018214617 A1 | 3/2020 |
| DE | 102020129349 A1 | 5/2021 |
| DE | 102019220348 A1 | 6/2021 |
| RU | 2016118261 A1 | 11/2017 |
| RU | 2694798 C1 | 7/2019 |
| WO | 2016045888 A1 | 3/2016 |
| WO | 2017211504 A1 | 12/2017 |
| WO | 2020047006 A1 | 3/2020 |
| WO | 2020060694 A1 | 3/2020 |

* cited by examiner

QUANTUM SENSOR

CROSS-REFERENCE TO RELATED APPLICATIONS

The present application is related to and claims the priority benefit of German Patent Application No. 10 2020 123 993.9, filed on Sep. 15, 2020, and International Patent Application No. PCT/EP2021/073825, filed Aug. 30, 2021, the entire contents of which are incorporated herein by reference.

TECHNICAL FIELD

The invention relates to a sensor apparatus for determining and/or monitoring a process variable of a medium in a containment as well as to a method for determining and/or monitoring the process variable by means of a sensor apparatus of the invention.

BACKGROUND

Field devices for monitoring and/or determining at least one, for example, chemical or physical, process variable of a medium are known in a wide variety of embodiments in the state of the art. In the context of the invention, in principle, all measuring devices are referred to as field devices, which are applied near to a process and which deliver, or process, process relevant information, thus, also remote I/Os, radio adapters, and, generally, electronic components, which are arranged at the field level. A large number of such field devices are produced and sold by the Endress+Hauser group of companies.

A newer development in the topic of sensors concerns so-called quantum sensors, in the case of which the most varied of quantum effects are utilized for determining various physical and/or chemical, measured variables. For example, such approaches are of interest in the field of industrial process automation especially regarding increased efforts toward miniaturization, coupled with increasing sensor performance.

DE3742878A1 describes, for example, an optical magnetic field sensor, wherein a crystal is used as magnetically sensitive optical component.

Known from DE102017205099A1 is a sensor apparatus having a crystal body containing at least one defect, a light source, a high frequency system for impinging the crystal body with a high frequency signal, and a detection unit for detecting a magnetic field-dependent fluorescent signal. The light source is arranged on a first substrate and the detection system is arranged on a second substrate, while the high frequency system and the crystal body can be arranged on the two mutually connected substrates. The measured variables can be external magnetic fields, electrical currents, temperature, mechanical stress or pressure. A similar apparatus is known from DE102017205265A1.

DE102014219550A1 describes a combination sensor for registering pressure, temperature and/or magnetic fields, wherein the sensor element has a diamond structure with at least one nitrogen vacancy center.

DE102018214617A1 discloses a sensor system, which likewise has a crystal body with a plurality of color, or F, centers, in the case of which different optical filter elements are used for increasing effectiveness and for miniaturization.

DE102016210259A1 discloses another form of sensor apparatus as well as a calibration and evaluation method based on defects in a crystal. The sensor apparatus includes a crystal body having at least one defect, a light source, a microwave antenna for supplying the crystal body with microwaves, a detection system for registering fluorescence from the crystal body, and an application system, by means of which an inductive current can be applied to the microwave antenna. Thus, the microwave antenna serves for production of the microwaves and for producing an internal magnetic field. The internal magnetic field enables calibration during ongoing operation.

SUMMARY

Starting from the state of the art, an object of the invention is to expand the application domain of such technologies.

The object is achieved by the sensor apparatus and the method according to the present disclosure.

As regards the sensor apparatus, the object of the invention is achieved by a sensor apparatus for determining and/or monitoring a process variable of a medium in a containment, comprising:
  a crystal body having at least one defect,
  a magnetic field system for producing a magnetic field,
    wherein the magnetic field system is arranged in such a manner that by means of the magnetic field system a magnetic field is producible in the region of the crystal body and in the region of the medium located within the containment, and
    wherein the crystal body and the magnetic field system are arrangeable from the outside at a wall of the containment,
  a detection unit for detecting a magnetic field-dependent, fluorescent signal from the crystal body,
    wherein the detection unit has an excitation unit for optical exciting of the defect and a detector for detecting the fluorescent signal, and
  an evaluation unit for ascertaining at least one piece of information concerning the process variable based on the fluorescent signal.

The defects in the crystal body are optically excited and fluorescence of the defects detected and evaluated. Additionally, by means of the magnetic field system, a magnetic field is produced in the region of the crystal body and in the region of the containment. This magnetic field is, in turn, influenced by medium present in the containment, for example, as a result of presence or absence of the medium, a change of the fill level, or a change of at least one, especially physical or chemical, property of the medium. A change of the magnetic field, in turn, influences the fluorescent signal of the defects, such that, based on the magnetic field-dependent fluorescent signal, a process monitoring is possible, or a process variable is ascertainable. Advantageously, very high measurement resolutions of media related change of the magnetic field can be registered based on defects in crystal bodies. This enables a very high accuracy of measurement.

Additionally, the sensor apparatus of the invention provides an apparatus securable from the outside at the containment. It can terminate flush with the wall of the containment and thus be non-invasive. A determining of one or more process variables by means of a flushly installed or non-invasive measuring arrangement is very advantageous in the field of process automation for various reasons and there is a general striving to implement such solutions for the most varied of applications. This can, however, be difficult in individual cases. Thus, such devices are only available isolatedly, and, when available, their application range is limited. The present invention provides a flush or non-invasive sensor, which enables a multiplicity of applications and by means of which a comprehensive process analysis is possible.

The containment is especially a container or a pipeline.

The detection unit includes an excitation unit for optical exciting of the defect. The excitation unit can be, for example, a laser or a light emitting diode (LED). The detector of the detection unit can, in turn, be, for example, a photodetector or a CMOS sensor. Additionally, the detection unit can include other optical elements, such as, for example, various filters, lenses or mirrors.

In an embodiment, the crystal body is a diamond having at least one nitrogen defect, silicon carbide having at least one silicon defect or hexagonal boron nitride having at least one color center defect.

The crystal body according to the invention includes at least one defect. However, also a plurality of defects can be used. In such case, especially a linear arrangement of the defects is preferable. A plurality of defects leads to an increased intensity, such that the measuring resolution is improved, and intensity changes become detectable even in the case of comparatively weak magnetic fields.

In an additional embodiment, the magnetic field system comprises at least one coil. Advantageously, the coil surrounds the crystal body, at least partially, when the crystal body and the magnetic field system are arranged at the wall of the containment. The crystal body is preferably arranged, at least partially, within the coil.

On the one hand, a compact construction of the sensor apparatus can be chosen. In such case, the detection unit is arranged in the direct vicinity of the magnetic field system and the crystal body. In another embodiment, the sensor apparatus includes, however, additionally, an optical fiber for leading the fluorescent signal from the crystal body to a detection unit. In the latter case, the detection unit is arranged spatially separated from the other components of the sensor apparatus. Which variant is preferable depends on the particular application of the sensor apparatus. The accuracy of measurement depends, in such case, among others, decisively on the components of the detection unit, for example, the excitation unit, the optical components, etc. The detection unit as well as its arrangement relative to the remaining components of the sensor apparatuses are selected corresponding to contemplated application.

Additionally, it is, on the one hand, an option to secure the sensor apparatus from the outside on the wall of the containment. In such case, a non-invasive determining of the at least one process variable can occur. An alternative embodiment provides, however, that the sensor apparatus is embodied in such a manner that it is applied flushly in the wall of the containment. Thus, the sensor apparatus includes in an embodiment a frame for introducing at least one component of the sensor apparatus into a wall of the containment. This frame can be provided in a correspondingly embodied opening in the wall of the containment. The frame is produced from a predeterminable material, for example, stainless steel. An advantage in this connection is that, by means of the frame, influences of the wall of the containment on the determining of a process variable can be minimized or eliminated.

In additional embodiments of the sensor apparatus of the invention, a unit for exciting high frequency- or microwave radiation can be present. This enables the exciting of electrons to higher energy levels.

The object of the invention is achieved, furthermore, by a method for determining and/or monitoring a process variable of a medium in a containment by means of a sensor apparatus of the invention, comprising method steps as follows:
producing a magnetic field in the region of the crystal body and in the region of the medium located within the containment,
exciting the defect in the crystal body to fluoresce,
detecting the magnetic field-dependent, fluorescent signal from the crystal body, and
ascertaining at least one piece of information concerning the process variable based on the fluorescent signal.

Advantageously, the method of the invention as well as the sensor arrangement of the invention are distinguished by a very high accuracy of measurement, both regarding absolute as well as also relative information concerning the medium. Even very small magnetic field changes brought about by the medium or changes brought about in the region of the medium are detectable with high precision not achievable with conventional measuring devices of the state of the art.

An embodiment of the method includes that based on the fluorescent signal at least one variable characteristic for the magnetic field is ascertained, especially the magnetic susceptibility or the magnetic permeability. This magnetic field characteristic variable can, in turn, be taken into consideration for ascertaining the information concerning the process variable.

In this connection, it is, for example, advantageous that at least one physical and/or chemical, characteristic variable of the medium is ascertained based on the variable characteristic for the magnetic field. In such case, the variable characteristic for the magnetic field can be, for example, the magnetic permeability of the medium, especially in the case of non-electrically conductive media. In the case of electrically conductive media, however, for example, also the electrical conductivity is ascertainable, for example, based on an eddy current. However, also other quality parameters of the medium can be determined.

It is likewise advantageous that based on the variable characteristic for the magnetic field a state monitoring of a process running in the containment is made. Especially, the variable characteristic for the magnetic field, or a variable derived therefrom, can be considered as a function of time. Examples of state monitoring include, for example, monitoring mixing of at least two media or monitoring chemical reactions occurring within the containment.

The sensor apparatus of the invention, and the method of the invention, enable, thus, a comprehensive process monitoring.

Another embodiment of the method of the invention includes that a predeterminable limit level of the medium in the containment is monitored. The sensor of the invention system can, thus, also be used as a limit level switch for monitoring a predeterminable fill level of medium in the containment.

Advantageously in this connection, a limit value for the variable characteristic for the magnetic field is predetermined, and wherein upon exceeding or falling below the limit value a reaching of the predeterminable limit level is signaled.

An alternating field or a direct field can be used in connection with the method of the invention. While alternating fields are advantageous, especially for evaluation of the measurement signals, influences of eddy currents forming in the case of conductive containments have to be taken into consideration. In this connection, a flush embodiment of the sensor apparatus using a suitable frame of known material can be advantageous, since, in this way, the influence of the arising eddy currents is known and can be minimized or eliminated.

Finally, it is provided in an embodiment of the method of the invention to produce the magnetic field produced in the region of the crystal body and in the region of the medium located within the containment as an alternating field, and to vary the frequency of the alternating field. The penetration depth of the magnetic field through a wall of the containment, especially in the case of conductive containments, and the penetration depth into the medium, depend on the frequency of the magnetic field. The penetration depth increases with decreasing frequency. By varying the frequency of the alternating field, a multidimensional analysis of the medium in the containment can be performed. In this way, for example, accretions, gradients in composition of the medium as a function of site within the containment, and sediments can be detected.

It is to be noted here that the embodiments described in connection with the sensor apparatus of the invention can be applied mutatis mutandis in the method of the invention and vice versa.

BRIEF DESCRIPTION OF THE DRAWINGS

The invention will now be explained in greater detail based on the appended drawing, the figures of which show as follows.

Figure 1:
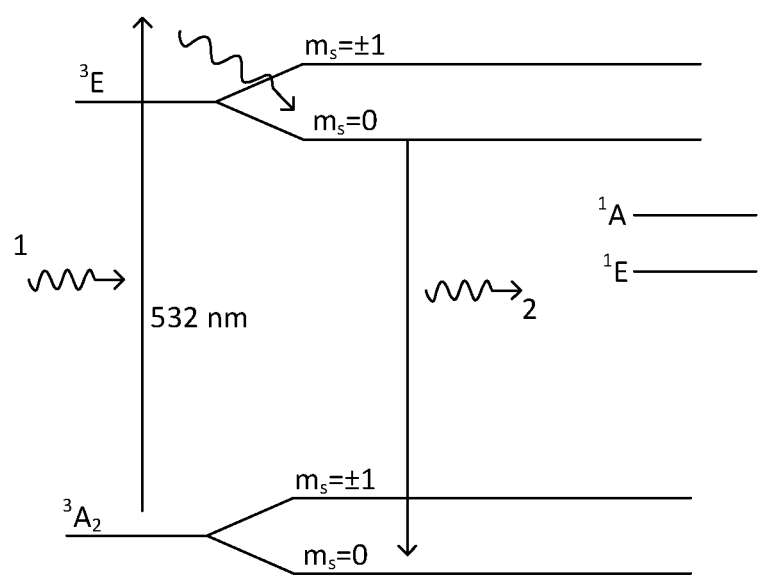
FIG. 1 shows a simplified energy level diagram for negative NV centers in diamond.

In the figures, equal elements are provided with equal reference characters.

DETAILED DESCRIPTION

With reference to FIG. 1, firstly, the exciting of a fluorescence of a defect in a crystal body will be explained, by way of example, for the case of an NV center in diamond. The considerations can be applied to other crystal bodies with corresponding defects.

Diamond as one of the elementary forms of carbon has a cubic, face-centered crystal structure with two atoms per primitive cell. Referred to as an NV center is a vacant carbon atom (V) at a lattice site having a nitrogen atom (N) as one of the four nearest neighbors. Important for the exciting and evaluation of fluorescent signals are, especially, the negative NV centers, which have an extra electron from the diamond lattice associated with them.

Diamond structures with embedded, negative NV centers are assigned to the symmetry group $C_{3v}$, which determines the possible spatial eigenstates of the NV center. As evident based on the energy level diagram without resonant excitation and without external magnetic field in FIG. 1, a triplet ground state $^3A_2$ and an excited triplet state $^3E$ result, between which lie two metastable singlet states $^1E$ and $^1A$. The triplet ground state $^3A_2$ has three magnetic substrates $m_s=0, \pm 1$. Also in the case of the excited $^3E$ state, there is a splitting of the energy levels.

By excitation 1 with light of wavelength λ=532 nm, for example, an excitation of a vibration state of the excited $^3E$ state occurs, with following Frank-Condon transition to the ground state $^3A_2$, in the case of which a fluorescence photon 2 with a wavelength of λ=630 nm is emitted. Upon applying an external magnetic field, additionally, a Zeeman splitting of the energy level occurs, and, associated therewith, two fluorescence minima are emitted, whose separation is, for example, proportional to the applied magnetic field strength B.

The evaluation of the fluorescent light can occur according to the invention in many different ways. Besides the above mentioned evaluation of the energy difference between the two energy levels, which allows an ascertaining of the magnetic field based on the Zeeman formula, in an alternative optical evaluation method, also the intensity of the radiated light can be considered, such likewise being proportional to the magnetic field. An electrical evaluation is, in turn, an option, for example, via a Photocurrent Detection of Magnetic Resonance (PDMR). Besides these examples of evaluation of the fluorescent signal, other options are available, which likewise fall within the scope of the invention.

Figure 2A:
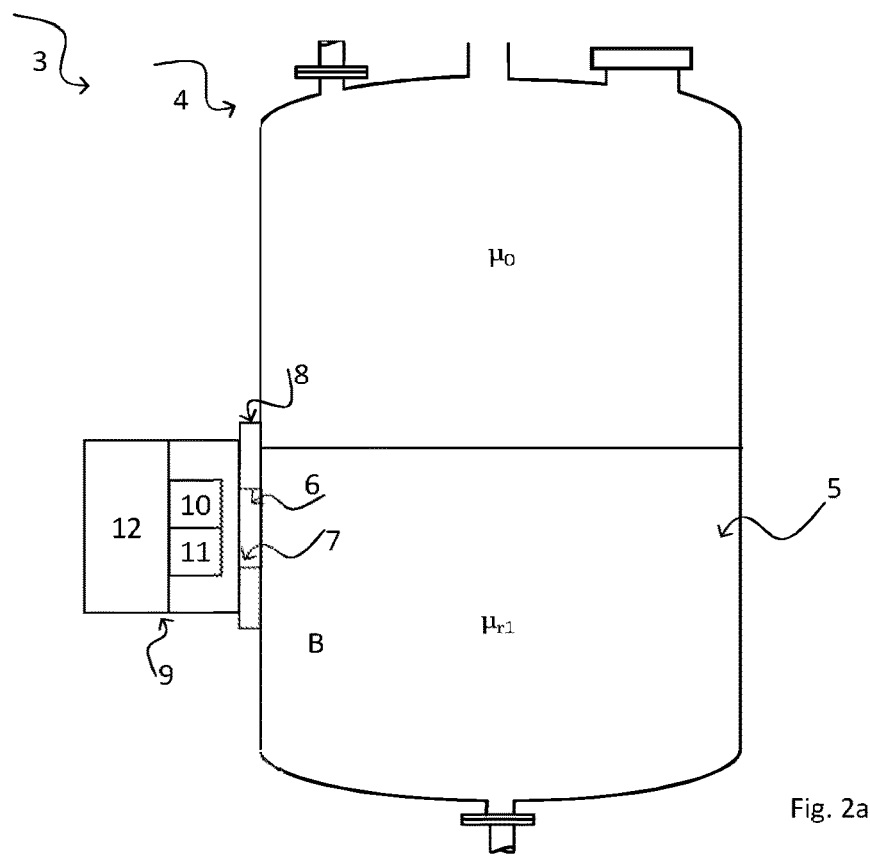
FIGS. 2a and 2b show separate embodiments of a sensor apparatus according to the present disclosure.
Figure 2B:
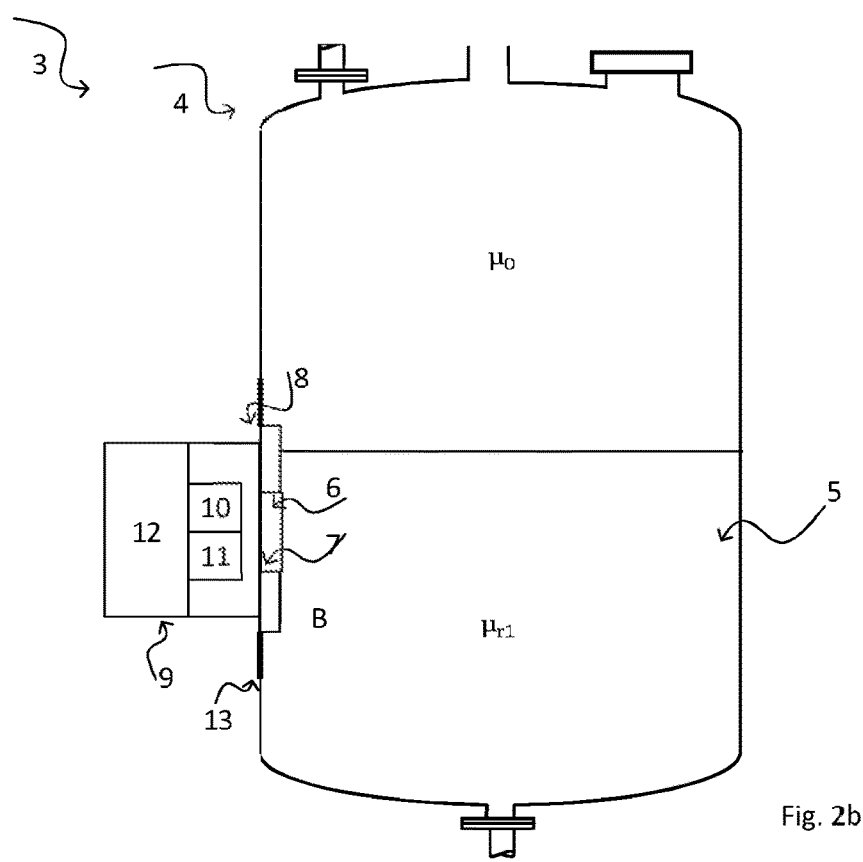

FIGS. 2a and 2b show possible examples of embodiments of a sensor apparatus 3 of the invention, as mounted on an outer surface of a containment 4 in the form of a container, which is filled partially with a medium 5. Sensor apparatus 3 includes a crystal body 6 having at least one defect 7, and a magnetic field system 8 having at least one con, which at least partially surrounds the crystal body 6. In the case of the embodiment illustrated here, the crystal body 6 is arranged within the coil 8. The magnetic field system 8 serves for producing a magnetic field B in the region of the crystal body 6 and in the region of an internal volume of the containment 4.

Additionally, the sensor apparatus includes a detection unit 9 having an excitation unit 10 and a detector 11 for detecting the fluorescent signal 2, as well as an evaluation unit 12 for additional evaluation of the signal 2 and for ascertaining the at least one piece of information concerning the process variable.

While FIG. 2a shows a non-invasive sensor apparatus 3 securable from the outside on the wall of the containment 4, FIG. 2b shows an apparatus 3 terminating flushly with the wall of the container 4. The apparatus 3 of FIG. 2b includes a frame 13, by means of which at least one component of the sensor apparatus 3 (here, the crystal body 6 and the coil) is securable in an opening of the wall of the container 4.

Figure 3:
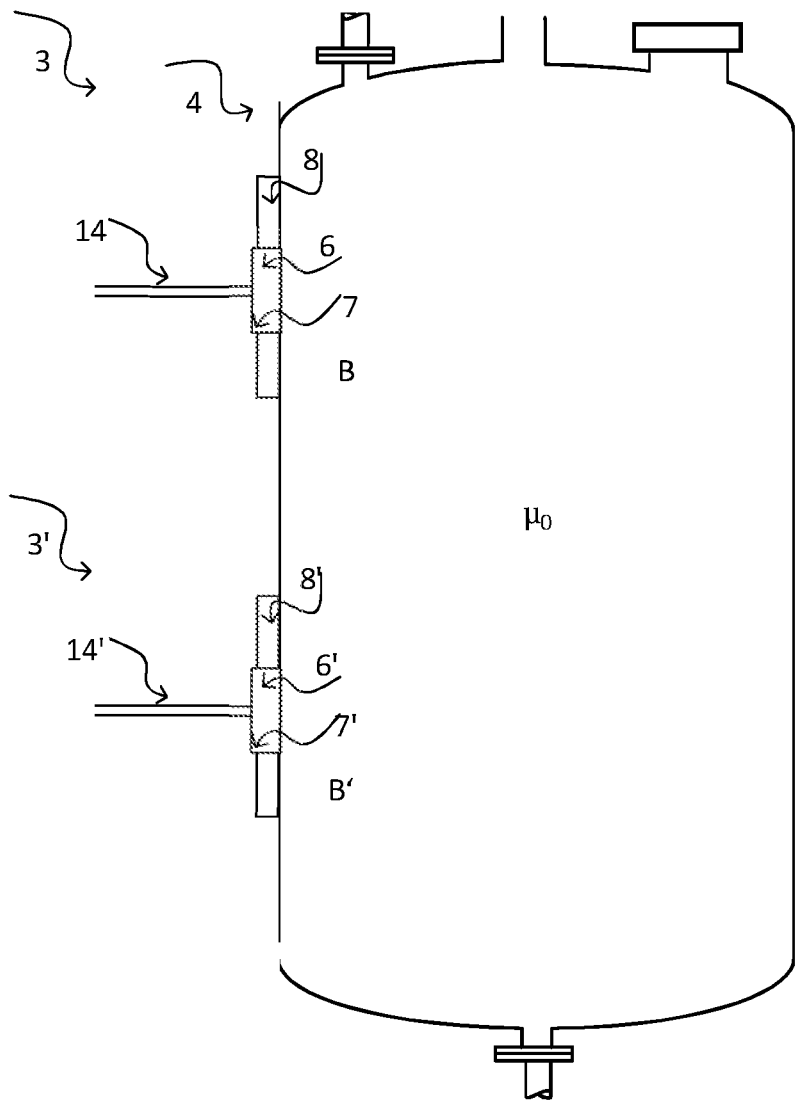
FIG. 3 shows another embodiment of a sensor apparatus according to the present disclosure.

FIG. 3 shows another possible embodiment of a system having two apparatuses 3 and 3' of the invention.

In contrast with the embodiments of FIGS. 2a and 2b, in the case of FIG. 3, a compact construction is not used, but, instead, the detection units 9, 9' and the evaluation units 12, 12' are arranged spatially removed from the remaining components of the sensor apparatuses 3 and 3' and therefore not shown. In order, in each case, to be able to lead the fluorescent signal 2 to a detection unit 9, 9', the two displayed sensor apparatuses 3, 3' include, in each case, an optical fiber 14, 14' for bringing the light from the crystal bodies 6, 6' to the respective detection units 9, 9'. It is even an option to use one detection unit 9 for the two crystal bodies 6, 6', instead of two separate detection units 9, 9'. The excitation unit 11 can be arranged in the region of the container 4 or with the evaluation unit 12. Also, a shared excitation unit 11 can be used for the excitation, instead of two separate units.

The sensor apparatus 3 of the invention and the method of the invention permit a comprehensive process monitoring expanding the capabilities of reassuring methods known from the state of the art for process automation. On the one hand, process variables such as a predeterminable fill level of medium in the containment can be monitored. Moreover, however, also a comprehensive characterizing of the medium 5, or of processes transpiring within the containment 5, can be performed. Additionally, the apparatus 3 of the invention is advantageously a non-invasive sensor, which, thus, requires no invasion of the ongoing process and which enables, in simple manner, a miniaturization of a sensor apparatus while at the same time widening the field of application.

The invention claimed is:

1. A sensor apparatus for determining and/or monitoring a process variable of a medium capable of filling a containment to a plurality of different fill levels, the sensor apparatus comprising:
   a crystal body including at least one defect;
   a magnetic field system configured to generate a magnetic field in a region of the crystal body, and in a region of the medium capable of filling the containment to the plurality of different fill levels, within the containment, wherein the crystal body and the magnetic field system are respectively configured as to be arranged at a wall of the containment from the outside;
   a detection unit configured to detect a magnetic field-dependent fluorescence signal emitted from the crystal body in a manner dependent upon the magnetic field, wherein the detection unit comprises an excitation unit configured to optical excite the at least one defect of the crystal and comprises a detector configured to detect the fluorescence signal; and
   an evaluation unit configured to determine at least one piece of information about the process variable of the medium capable of filling the containment to the plurality of different fill levels, based on the fluorescence signal; and
   wherein the process variable includes a fill level of the medium, and the magnetic field in the region of the medium is dependent on a change to the fill level.

2. The sensor apparatus of claim 1, wherein the crystal body is:
   diamond, wherein the at least one defect is at least one nitrogen defect;
   silicon carbide, wherein the at least one defect is at least one silicon defect; or
   hexagonal boron, wherein the at least one defect is at least one color center defect.

3. The sensor apparatus of claim 1, wherein the magnetic field system comprises at least one coil.

4. The sensor apparatus of claim 3, wherein the at least one coil surrounds the crystal body, at least partially, when the crystal body and the magnetic field system are arranged at the wall of the containment.

5. The sensor apparatus of claim 1, further comprising an optical fiber configured to guide the fluorescence signal from the crystal body to the detection unit.

6. The sensor apparatus of claim 1, further comprising a frame configured to enable introduction of at least one component of the sensor apparatus into the wall of the containment.

7. A method for determining and/or monitoring a process variable of a medium in a containment using the sensor apparatus according to claim 1, the method comprising:
   generating a magnetic field in the region of the crystal body and in the region of the medium within the containment using the magnetic field system;
   exciting the at least one defect in the crystal body to fluoresce via the magnetic field;
   detecting the magnetic field-dependent fluorescence signal from the crystal body; and
   determining the at least one piece of information about the process variable based on the fluorescence signal.

8. The method of claim 7, wherein based on the fluorescence signal at least one variable characteristic for the magnetic field is determined.

9. The method of claim 8, wherein the at least one variable characteristic for the magnetic field is the magnetic susceptibility or the magnetic permeability.

10. The method of claim 8, wherein at least one physical and/or chemical, characteristic variable of the medium is determined based on the at least one variable characteristic for the magnetic field.

11. The method of claim 8, wherein based on the at least one variable characteristic for the magnetic field a state monitoring of a process running in the containment is performed.

12. The method of claim 8, wherein a predeterminable limit level of the medium in the containment is monitored.

13. The method of claim 12, wherein a limit value for the at least one variable characteristic for the magnetic field is predetermined, and wherein upon exceeding or falling below the limit value a crossing of the predeterminable limit level is signaled.

14. The method of claim 8, wherein the magnetic field generated in the region of the crystal body and in the region of the medium within the containment is generated as an alternating field, wherein the frequency of the alternating field is varied.

15. A sensor apparatus for determining a process variable of a medium in a containment, the sensor apparatus comprising:
   a crystal body including at least one defect;
   a magnetic field system configured to generate a magnetic field in a region of the crystal body and in a region of the medium within the containment,
   wherein the crystal body and the magnetic field system are respectively configured as to be arranged at a wall of the containment from the outside;
   a detection unit configured to detect a magnetic field-dependent fluorescence signal emitted from the crystal body,
   wherein the detection unit comprises an excitation unit configured to optical excite the at least one defect of the crystal and comprises a detector configured to detect the fluorescence signal; and
   an evaluation unit configured to:
      determine based on the fluorescence signal a variable characteristic for the magnetic field; and
      determine a process variable characteristic including at least one of a presence, an absence, a fill level, a change to a fill level, or a chemical property, of the medium in the containment, based on the variable characteristic for the magnetic field.

16. The sensor apparatus of claim 15 wherein the variable characteristic of the magnetic field includes a magnetic susceptibility or a magnetic permeability.

17. The sensor apparatus of claim 15 wherein the evaluation unit is further configured to monitor a predeterminable limit level of the medium in the containment as the process variable by signaling when the variable characteristic for the magnetic field exceeds or falls below a predetermined limit value for the variable characteristic for the magnetic field.

18. The sensor apparatus of claim 15 wherein the process variable characteristic includes the chemical property of the medium.

19. The senor apparatus of claim 15 wherein the process variable characteristic includes the fill level of the medium.

\* \* \* \* \*